March 5, 1946.  G. W. McENTIRE  2,396,053
THERMOSTATIC OIL COOLER CONTROL
Filed Oct. 19, 1942   3 Sheets-Sheet 1
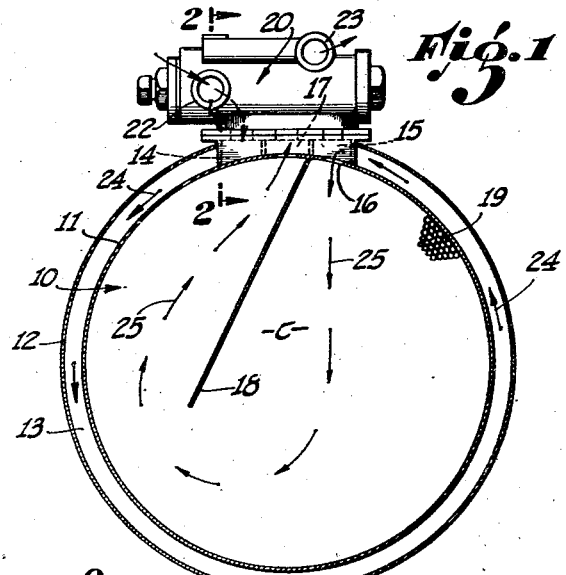
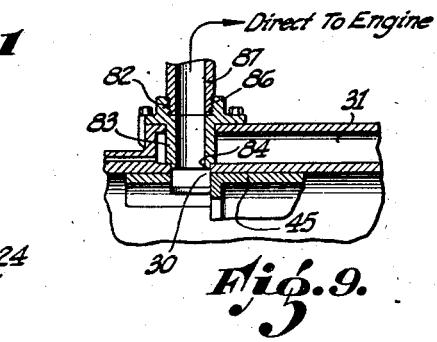
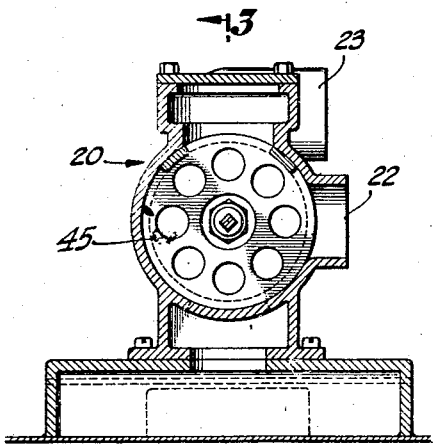
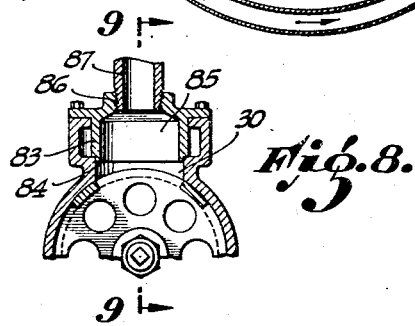
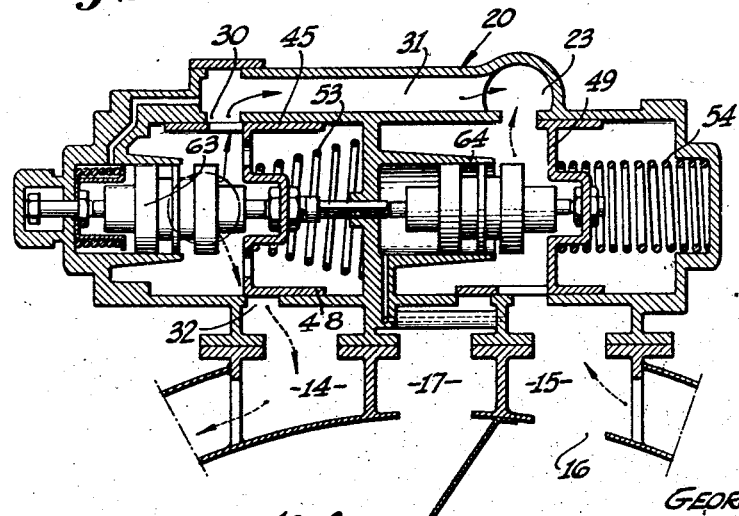
INVENTOR.
GEORGE W. McENTIRE
BY
ATTORNEY.

March 5, 1946.　　　G. W. McENTIRE　　　2,396,053
THERMOSTATIC OIL COOLER CONTROL
Filed Oct. 19, 1942　　　3 Sheets-Sheet 2

INVENTOR.
GEORGE W. McENTIRE
BY
ATTORNEY.

Patented Mar. 5, 1946

2,396,053

UNITED STATES PATENT OFFICE 2,396,053

THERMOSTATIC OIL COOLER CONTROL

George W. McEntire, Los Angeles, Calif., assignor to The Garrett Corporation Airesearch Manufacturing Company division, Los Angeles, Calif., a corporation of California Application October 19, 1942, Serial No. 462,526

17 Claims. (Cl. 257—2)

This invention relates to a control for use with heat exchange equipment to control the movement of a fluid stream in desired relation to the heat exchanger, and relates in particular to a control having especial utility with oil coolers of the type employed with aircraft engines, such oil coolers comprising a heat exchanger wherein the heated oil from the engine is passed in heat exchange relation with a flow of cooling medium comprising air, to reduce the temperature of the oil and increase its velocity to desired values.

It is an object of the invention to provide an oil cooler having a control which will direct the oil stream through the cooler only when its temperature has been raised above a predetermined minimum. Accordingly, during the starting period when the oil in the engine is cold and cold oil is pumped through the oil circulating system, the oil will be caused by the control to bypass the cooler, to facilitate warming of the oil to a normal working temperature.

A further object of the invention is to provide a cooler having a cooling chamber or core and a warm-up chamber, with a thermostatic control equipped with a bypass passage, this control acting, when the oil is cold, to direct the same through the bypass outside the cooler, then, as the oil warms up, to direct the same through the warm-up chamber of the cooler, and, as the temperature of the oil increases, to direct the oil flow through the cooling chamber or core of the cooler.

It is an object of the invention to provide a control device of the character indicated in the preceding paragraph having a valve system for control of both the inlet and outlet openings of the cooler, and first and second thermostats operatively associated with the inlet and outlet openings of the cooler, for control of the valve system.

It is a further object of the invention to provide a control device for heat exchange equipment, having pressure responsive valves for protecting the cooler against excessive pressures which may develop in the oil circulating system.

It is an object of the invention to provide a control of the character described having a valve with means for moving the same in response to temperature changes and also in response to pressure changes.

A further object is to provide in a control device of this character, a valve which is moved in a forward direction by a thermostat which is mounted so as to move bodily in response to changes in pressure in a fluid, this movement of the thermostat in response to pressure change acting also to move the valve. Whether the bodily movement of the thermostat results in forward or rearward movement of the valve will depend upon the particular location of the valve or the conditions under which it is used, as will be hereinafter illustrated.

Further objects and advantages of the invention will be brought out in the following part of the specification.

Referring to the drawings which are for illustrative purposes only:

Fig. 1 is a schematic view showing a cooler with a control device mounted thereon as a separately manufactured unit.

Fig. 2 is an enlarged fragmentary section on a plane indicated by the line 2—2 of Fig. 1.

Fig. 7 is a view showing the manner in which the control acts to protect the cooler from excessive pressures existing in the oil circulating system.

Fig. 8 is a fragmentary cross-sectional view on the plane indicated by the line 2—2 of Fig. 1 showing my special by-pass adaptor in place.

Fig. 9 is a fragmentary cross-section taken as indicated by the line 9—9 of Fig. 8.

Figure 3:
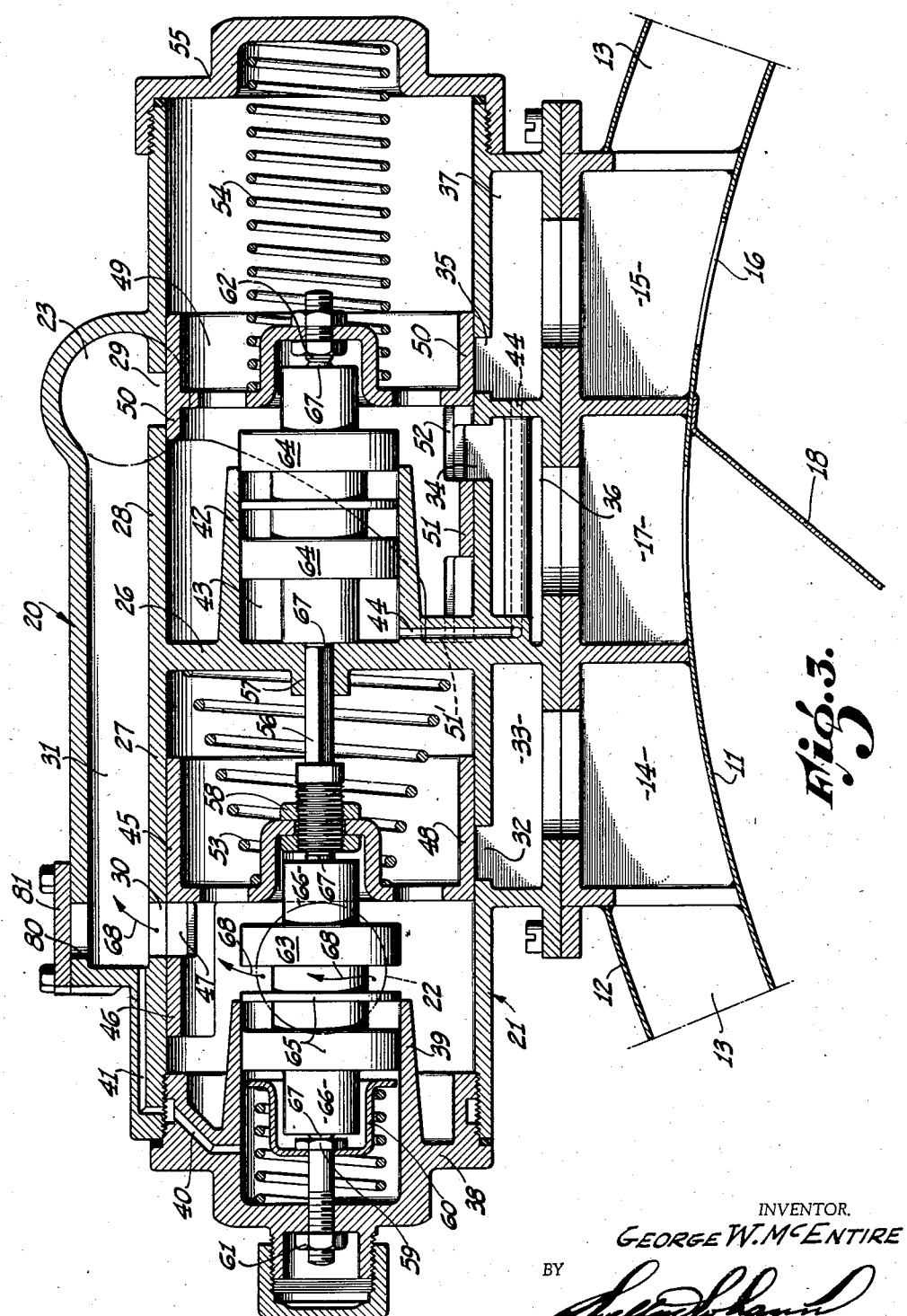
Fig. 3 is a greatly enlarged longitudinally sectioned view of the control device and a portion of the cooler, taken as indicated by the line 3—3 of Fig. 2.

In Fig. 1 I schematically indicate a cooler 10 comprising a cylindric shell 11 defining the cooling chamber or core C of the cooler. Around the cylindric shell 11 there is an outer cylindric jacket 12 which defines an annular warm-up space extending substantially entirely around the exterior of the shell 11. This warm-up space 13 has a warm-up inlet 14 and a warm-up outlet 15 which communicates with a core inlet port 16. The core C is provided with an outlet port 17, and within the core C suitable baffles for directing the flow of oil therein are provided, such baffles being indicated in Fig. 1 by a single baffle plate 18. It will be understood that the core C has therein suitable heat absorbing means such as thin walled metal tubes 19 through which a flow of air is conducted.

A control device 20 is associated with the cooler 10 in the manner shown in Fig. 1, this control device 20 having a shell 21 equipped with a hot oil inlet 22 for connection to the piping through which hot oil is pumped from the engine during the normal operation thereof, and a cooled oil outlet 23 which is connected to return piping which leads to the oil reservoir of the oil circulating system. During what may be referred to as the normal operation of the cooler, hot oil delivered to the inlet 22 will be directed to the warm-up inlet 14 and, as indicated by arrows 24, will flow through the warm-up space 13 to the core inlet 16 and the oil will then flow through the core C, as indicated in general by arrows 25, to the core outlet 17, and thereafter through the control device 20 to the outlet 23 connected with the return piping, as will be hereinafter described in detail.

As shown in Fig. 3, the control device shell 21 comprises an intermediate wall 26 having cylinders 27 and 28 extending from the opposite sides thereof. The upper wall of the cylinder 28 has therein an outlet port 29 communicating with the outlet opening 23, and the cylinder 27 has a bypass port 30 connected to the outlet 23 by a bypassage 31. In the lower cylinder 27 there is a port 32 which communicates with a space 33 in the lower part of the shell 21 which in turn communicates with the warm-up inlet 14, and in the lower wall of the cylinder 28 there are ports 34 and 35 in side by side relation. The port 34 communicates through a space 36 in the lower part of the casing 21 with the core outlet 17, and the port 35 communicates through a space 37 with the warm-up outlet 15.

The leftward end of the cylinder 27 is closed by a removable body or wall 38 comprising a cylinder 39 having an open end faced rightward or communicating with the interior of the cylinder 27. The leftward end of the space within the cylinder 39 communicates through a passage 40 in the body 38 and a passage 41 in the casing 21 with the bypassage 31. On the rightward face of an intermediate wall 26 there is a cylinder 42 of substantially the same diameter as the cylinder 39, this cylinder 42 being open at its rightward end. The leftward end of the chamber 43 defined by the cylinder 42 communicates through a duct 44 in the shell 21 with the space 37 which in turn communicates with the warm-up outlet 15.

A cylindric inlet valve 45 is shown in its initial or first position in the cylinder 27. This valve 45 has a cylindric wall 46 with an opening or port 47 for cooperation with the bypass port 30, and a wall 48 which closes the port 32 when the valve 45 is in its first position. Within the cylinder 28 there is a cylindric valve 49. This valve 49 has a cylindric wall 50, which in the first position of the valve, as shown in Fig. 3, closes ports 29 and 35. The valve 49 has a projecting cylindric wall 51 containing a port 52 cooperating with the port 34 of the cylinder 28. The wall 51, as shown at 51', engages the transverse wall 26 and serves as a stop to limit leftward movement of the valve 49.

A relatively light compression spring 53 is disposed between the valve 45 and the intermediate wall 26 to urge the valve 45 leftward toward the position in which it is shown in Fig. 3, and a relatively light spring 54 is disposed between the valve 49 and a cap 55 which closes the rightward end of the cylinder 28, to urge the valve 49 leftward into the position in which it is shown. The valve 45 carries a bar 56 which projects rightward so that its rightward end extends substantially through an opening 57 in the intermediate wall 26, the bar 56 being shown adjustably secured to the valve 45 by use of spaced nuts 58. Within the cylinder 39 there is a yieldably supported stop screw 59 carrying on its rightward end a cup 60 to receive and transmit to the stop 59 the rightward thrust of a relatively heavy spring 61. The valve 49 carries an adjustable abutment in the form of an adjustably supported screw 62.

Figure 4:
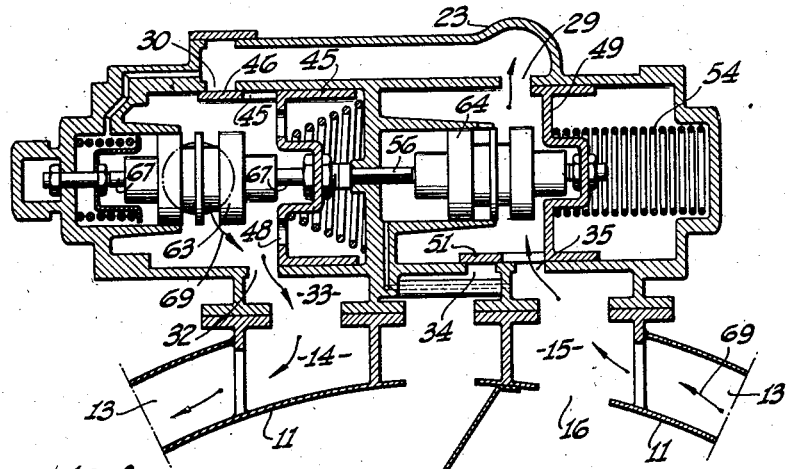
Fig. 4 is a view similar to Fig. 3, drawn to reduced scale, showing the second position of the control parts.
Figure 5:
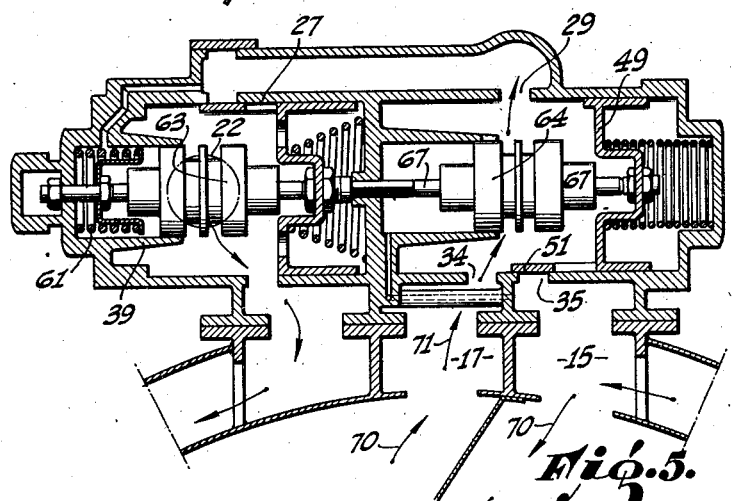
Fig. 5 is a view similar to Fig. 4, showing the third position of the control parts.

So as to lie partly within the cylinder 39, a thermostat 63 of positive displacement type is placed between the yieldable stop 59 and the central portion of the valve 45. A similar thermostat 64 is disposed in the cylinder 42 so that it will lie between the rightward end of the bar 56 and the adjustable abutment 62 of the valve 49. The thermostats 63 and 64 comprise a shell 65 having cylindric end portions 66 from which thrust pins 67 project. The shells 65 of these thermostats 63 and 64 contain therein a substance having a relatively high rate of expansion in response to temperature rise. When the thermostats 63 and 64 are cold, the thrust pins 67 project only a short distance, or not at all, and, as the temperature of the thermostat is increased the value agreeing with the working temperature of the oil, these thrust members or pins 67 are caused to project from the ends of the thermostats 63 and 64 as shown in Figs. 4 and 5, so that the function of these thermostats may be utilized, as will be hereinafter described.

Fig. 3 shows the condition of the control device when the oil in all of its parts is cold. For example, when an engine is first started up after a relatively long period of inactivity, the oil which passes into the cylinder 27 through the inlet opening 22, the position of which is indicated by dotted lines in Fig. 3, the thermostat 63 will be in its contracted condition and the bypass port 30 will be opened so that the cold oil will flow, as indicated by arrows 68, directly from the inlet 22 through the bypassage 31 to the outlet opening 23. Heat developed in the engine due to its operation will warm this flow of oil, indicated by the arrows 68, and as the temperature to which the thermostat 63 is subjected rises, the thrust pins 67 thereof will move outward so as to shift the valve 45 from the position in which it is shown in Fig. 3, toward and into its second position shown in Fig. 4, wherein the wall 46 will substantially close the bypass port 30, and the wall 48 of the valve 45 will open the port 32. The rightward movement of the valve 45 will be duplicated in the valve 49, since rightward movement of the valve 45 is accompanied by a like rightward movement of the bar 56 which shifts the thermostat 64 bodily rightward into the position in which it is shown in Fig. 4, and this movement of the thermostat 64 likewise forces the valve 49 rightward against the pressure of the spring 54 into the position thereof shown in Fig. 4, wherein the ports 29 and 35 are both uncovered and the wall 51 of the valve 49 covers the port 34. Therefore, when the thermostat 63 is first heated to operative temperature, the bypass port 30 will be closed, and the flow of heated oil will then pass as indicated by arrows 69 through the port 32 into the warm-up inlet 14 and thence through the warm-up space 13 to the warm-up outlet 15 from whence the flow of oil is then through the ports 35 anad 29 to the outlet opening 23 of the device.

The initial flow of warm oil through the warm-up space 13 will be somewhat cooled by the time it reaches the warm-up outlet 15, so that at first it will have but little effect upon the thermostat 64 which is in the path of flow of the oil from the port 35 to the port 29, but as the portion of the core adjacent the shell 11 increases in temperature, the heat extracted from the flow through the warm-up space 13 will diminish in value so that there will be a rise in temperature of the oil which passes across the thermostat 64. This will result in an expansion of the thermostat 64, so that its thrust pins 67 will be gradually projected toward the positions in which they are shown in Fig. 5. This will result in a movement of the valve 49 rightward from the position in which it is shown in Fig. 4 toward its position of Fig. 5, and the wall 51 of the valve will be moved from a position closing the port 34 to a position closing the port 35, at which time the port 34 will be open as shown in Fig. 5. As indicated by the arrows 70 in Fig. 5, the flow of hot oil from the warm-up outlet 15 will be downward through the core inlet port 16, through the cooler core and thence to the cooler outlet 17, from whence the oil will pass as indicated by arrows 71 through the port 34 to the port 29 which is connected to the outlet 23. Fig. 5, accordingly, shows the positions of the internal parts of the control device during the normal operation of the cooler.

Figure 6:
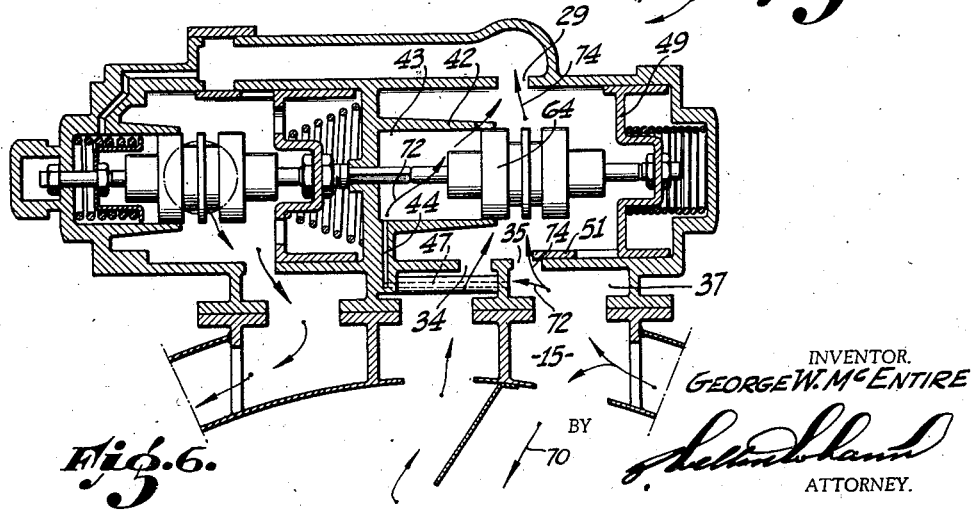
Fig. 6 is a view similar to Fig. 5, showing the manner in which the control releases pressure through the warm-up chamber when congealment of oil takes place in the cooler during the operation thereof.

Should there occur within the core of the cooler a resistance to the flow of oil therethrough, for example—as the result of congealment of oil in the core of the cooler—there will be a build-up in the pressure in the cooler inlet port 16 and the warm-up space 13, so that pressure existing in the warm-up outlet 15 and the space 37 of the casing 21 will be transmitted through the duct 44 to the leftward end of the chamber 43 defined by the cylinder 42, as indicated by arrows 72 in Fig. 6. This pressure will be exerted against the leftward face of the thermostat 64 to shift the same bodily rightward, thereby moving the valve 49 from the position in which it is shown in Fig. 5 toward and into the position thereof disclosed in Fig. 6, which movement of the valve 49 will carry the wall 51 thereof rightward into a position wherein at least a portion of the port 35 will be opened to permit a bypass flow of oil from the core outlet 15 through the port 35 to the port 29, as indicated by arrows 74 in Fig. 6, while at the same time thereby may continue to be some flow of oil along the path indicated by the arrows 70. As the congealment of oil in the cooler core thaws out, the flow of oil through the path indicated by the arrows 70 will increase and as the result of the corresponding pressure drop in the warm-up outlet 15 and the chamber 43 connected thereto, the thermostat 64 and the valve 49 will be permitted to move leftward so as to return to the positions thereof shown in Fig. 5.

If during the normal operation of the cooler, with the control parts positioned as shown in Fig. 5, there should be an unusual rise in pressure transmitted through the inlet 22 into the cylinder 27, such increased pressure will act leftward against the thermostat 63 which is disposed in the cylinder 39 in the manner of a movable piston, and will shift the thermostat 63 leftward against the force of the spring 61, as shown in Fig. 7. The spring 53 may then shift the valve 45 a corresponding distance leftward so that its wall 48 will close the port 32 and protect the cooler 10 from this excess pressure, and this leftward movement of the valve 45 will open the port 30, as shown in Fig. 7, so that the pressure increase may be transmitted through the bypassage 31 to the outlet opening 23 and the return piping connected thereto. At the same time the spring 54 will shift the valve 49 and the thermostat 64 leftward into the positions in which they are shown in Fig. 7.

A feature of the invention lies in the provision of means whereby the oil from the engine, during the starting period prior to the warming of the oil to such temperature that cooling thereof is required, is bypassed around both the cooler and the oil reservoir. The arrangement is such that during the starting and warm-up period of an engine, the crank case oil is circulated through a closed path until the oil has warmed up to operating temperature, after which the oil is delivered to the oil reservoir.

Referring to Fig. 3, it will be noted that there is a port 80 opposite the port 30, which port 80 is covered by a closure plate 81 when the control unit is employed in the manner previously described herein to divert the cold oil from the inlet 22 through the passage 31 to the outlet 23 which leads to the reservoir, as indicated by arrows 68.

When the invention is employed under conditions requiring a quick warm-up of the engine or where normal warm-up of the engine is retarded by temperature conditions, the cover plate 81 is removed and a fitting 82 is secured in the port 80 as shown in Fig. 8 and Fig. 9. This fitting 82 has an inwardly projecting tubular wall 83 of rectangular cross-section corresponding to the shape of the port 30, and the inner end of the wall 83 is provided with a lip 84 for cooperation with the walls forming the port 30. At the outer end of the passage 85 formed by the tubular wall 83 there is a port 86 for connection to oil return piping 87 through which the oil may be carried back to the inlet of the pressure pump serving the engine. Accordingly, during the warm-up period of the engine, when the oil fed through the inlet opening 22 of the device is cold, the thermostat 63 will maintain the valve member 45 in a position opening the port 30 so that the cold oil may flow directly back to the engine through a closed circuit formed in part by the piping 87.

I claim as my invention:

1. In an oil cooling device for the circulatory lubricating system of an internal combustion engine, the combination of: a cooler having an oil chamber; inlet means for connecting said chamber so that it will receive hot oil from said engine; outlet means leading from said chamber for return of cooled oil to said engine; a bypassage conduit connecting said inlet means and said outlet means for bypassing said chamber; a valve device for closing said conduit; a thermostat responsive to the temperature of the oil adjacent said chamber and conduit and connected to said valve device for operation thereof, to open and close said conduit under normal pressure conditions in correspondence with temperatures below and above a predetermined value respectively; and a fluid pressure operated device responsive to a pressure differential between said inlet and outlet in excess of a predetermined value for bodily moving said thermostat in a direction and for a distance which serves when said conduit is closed, to operate said valve device to open said conduit.

2. The combination defined in claim 1 in which said valve device is constructed to prevent oil flow through said chamber while opening said conduit and to permit said flow while closing said conduit.

3. In an oil cooling device for the circulatory lubricating system of an internal combustion engine, the combination of: a cooler having an inlet for connection to the hot oil delivery means of said engine and an outlet for connection to the return means of said engine; bypassage means for said cooler; a valve for opening said bypassage means; a thermostat responsive to the temperature of the oil in said inlet connected to close said valve at temperatures above a predetermined temperature and open said valve at lower temperatures; a movable wall connected to bodily move said thermostat to open and close said valve by transverse movements of said wall in one and the opposite directions respectively and exposed on the transverse side facing in said one direction to the oil pressure in said inlet and on the transverse side facing in said opposite direction to the oil pressure in said outlet whereby a differential pressure of predetermined value between said inlet and outlet opens said valve; and means additional to said thermostat for closing said valve against a pressure differential less than said predetermined value.

4. In an oil cooling device for the circulatory lubricating system of an internal combustion engine, the combination of: a cooler having an oil chamber provided with heat transfer walls between the oil in said chamber and said medium; inlet means connecting the hot oil delivery piping to said chamber; outlet means connecting said chamber to the return oil piping; bypassage means connecting said inlet and outlet means; a valve device for alternatively shutting off oil flow either through said bypassage or said chamber, while permitting flow through said chamber or bypassage respectively; a thermostat in said outlet means connected to operate said valve device to shut off oil through said bypassage or said chamber in correspondence with an increase or decrease in oil temperature above or below a predetermined value; and a fluid pressure operated device connected to be responsive to the pressure differential between said inlet and outlet for bodily moving said thermostat in correspondence with a pressure differential above a predetermined value resulting from closing said bypassage, in a direction and for a distance which when said bypassage means is closed serves to operate said valve device to open said bypassage means.

5. In an oil cooling device for the circulatory lubricating system of an internal combustion engine, the combination of: a cooler having a primary oil chamber provided with heat transfer walls between the oil in said chamber and said medium and having a secondary oil chamber disposed in heat exchange relation with said primary chamber and being relatively devoid of cooling means, each of said chambers having an inlet and an outlet; inlet chamber means for conveying hot oil to said secondary chamber inlet; passage means connecting said secondary chamber outlet with said primary chamber inlet; outlet chamber means for carrying cooled oil away from said primary chamber outlet; a first bypassage conduit connecting said inlet chamber to said outlet for bypassing both said primary and secondary chambers; a second bypassage conduit connecting said passage to said outlet chamber for bypassing said primary chamber; a first thermostatically controlled means responsive to the temperature of oil approaching said cooler for passing the oil through the cooler or the first bypassage in correspondence to temperatures above or below a first predetermined value respectively; and a second thermostatically controlled means responsive to the temperature of the oil returning to the engine for passing the oil leaving the secondary chamber through the second bypassage or primary chamber in correspondence to temperatures below or above a second and higher predetermined value respectively.

6. The combination defined in claim 5 and in addition thereto: fluid pressure controlled means responsive to the pressure differential between said inlet chamber and return piping for closing said secondary chamber inlet and opening said first bypassage in correspondence with pressure differentials in excess of a predetermined value.

7. The combination defined in claim 5 and in addition thereto: fluid pressure controlled means responsive to the pressure differential between said inlet chamber and return piping for closing said secondary chamber inlet and said outlet chamber outlet and opening said first bypassage in correspondence with pressure differentials in excess of a predetermined value.

8. The combination defined in claim 5 and in addition thereto: fluid pressure controlled means responsive to the pressure differential between said passage and said outlet chamber for opening said second bypassage in correspondence to pressure differentials in excess of a predetermined value.

9. The combination defined in claim 5 and in addition thereto: fluid pressure controlled means responsive to the pressure differential between said inlet chamber and return piping for closing said secondary chamber inlet and said outlet chamber outlet and opening said first bypassage in correspondence with pressure differentials in excess of a first predetermined value; and fluid pressure control means responsive to the pressure differential between said passage and said outlet chamber for opening said second bypassage in correspondence to pressure differentials in excess of a second and lower predetermined value.

10. In an oil cooling device for the circulatory lubricating system of an internal combustion engine, the combination of: a cooler having a primary oil chamber provided with heat transfer walls between the oil in said chamber and said medium and having a secondary oil chamber disposed in heat exchange relation with said primary chamber and being relatively devoid of cooling means, each of said chambers having an inlet and an outlet; inlet chamber means for delivering hot oil to said secondary chamber inlet; passage means connecting said secondary chamber outlet with said primary chamber inlet; outlet chamber means for discharge of oil from said primary chamber outlet; a first bypassage conduit connecting said inlet chamber to said outlet chamber for bypassing both said primary and secondary chambers; a second bypassage conduit connecting said passage to said outlet chamber for bypassing said secondary chamber; fluid pressure controlled means responsive to the pressure differential between said inlet chamber and outlet chamber for closing said secondary chamber inlet and said outlet chamber outlet and for opening said first bypassage in correspondence with pressure differentials in excess of a first predetermined value; and fluid pressure controlled means responsive to the pressure differential between said passage and said outlet chamber for opening said second bypassage in correspondence to pressure differentials in excess of a second and lower predetermined value.

11. In a regulated valve mechanism, automatically responsive to both temperature and pressure conditions of a fluid stream: an inlet chamber having an outlet; a thermostat responsive to the temperature of the fluid; a valve member connected to be moved by the live end of said thermostat; a movable wall spaced from said valve member connected to move the dead end of said thermostat; and stops limiting movement of the dead end of said thermostat, said thermostat being disposed in said inlet chamber, and one side of said wall for receiving pressure to move the valve member away from said stop being exposed to fluid pressure in said inlet chamber and the other side of said wall being exposed to the fluid pressure in said outlet passage.

12. In a regulated valve mechanism, automatically responsive to both temperature and pressure conditions of a fluid stream: a thermostat responsive to the temperature of the fluid; a valve member connected to be moved by the live end of said thermostat; a movable wall connected to move the dead end of said thermostat; a stop limiting operative movement of said dead end of said thermostat in the direction of said live end by said movable wall; yieldable means to resist movement of said dead end in the other direction away from said stop; and walls confining said stream and defining an inlet chamber, outlet passage, a cooling chamber between said inlet chamber and outlet passage, and a bypassage between said inlet chamber and outlet passage which bypasses said cooler chamber, said valve member having a valve for opening and closing the cooler and a valve for synchronously closing and opening the bypassage respectively as said live end moves in a direction away from or toward said dead end respectively, and said thermostat being disposed in said inlet chamber and that side of said wall for receiving pressure to move the valve member away from the stop being exposed to fluid pressure in said inlet chamber and the other side of said wall being exposed to the fluid pressure in said outlet passage.

13. In a regulated valve mechanism, automatically responsive to both temperature and pressure conditions of a fluid stream: a thermostat responsive to the temperature of the fluid; a valve member connected to be moved by the live end of said thermostat; a movable wall connected to move the dead end of said thermostat; a stop limiting operative movement of said dead end of said thermostat in the direction away from said live end by said movable wall; yieldable means to hold said dead end against movement in the other direction away from said stop; and walls confining said stream and defining an inlet passage, outlet chamber, a cooling chamber between said inlet passage and outlet chamber, and a bypassage between said inlet passage and outlet chamber which bypasses said cooler chamber, said valve member having a slide valve for opening and closing the cooler outlet and a slide valve for synchronously closing and opening the bypassage respectively as said live end moves in a direction away from or toward said dead end respectively, and said thermostat being disposed in said inlet chamber and that side of said wall for receiving pressure to move the valve member away from the stop being exposed to fluid pressure in said inlet passage and the other side of said wall being exposed to the fluid pressure in said outlet chamber, said thermostat being longitudinally expansible and said wall being a piston, both said thermostat and said wall being movable in parallelism with the movement of said slide valves and said wall being a piston mounted on the dead end of said thermostat and being slidable within a closed cylinder connected to said inlet passage and said yieldable means being a coiled spring mounted in said outlet chamber and bearing against said piston.

14. In an oil cooling device for the circulatory lubricating system of an internal combustion engine, the combination of: a cooler having an oil chamber; inlet means for carrying hot oil to said chamber; outlet means from which the cooled oil is carried off from said chamber; a by-passage conduit connecting said inlet and said outlet for bypassing said chamber; a first valve between said inlet means and chamber; a second valve between said chamber and outlet means; a third valve for opening and closing said bypassage; a thermostat in said inlet means having its live end connected upon expanding movement to close said third valve and synchronously open said first and second valves and upon contracting movement to open said third valve and close said first and second valves; and a fluid pressure operated device responsive to the pressure differential between said inlet means and outlet means for moving the dead end of said thermostat from an initial position in a direction away from said live end in response to a pressure differential exceeding a predetermined value.

15. The combination defined in claim 14 and in addition thereto: a fluid pressure operated device responsive to the pressure differential between said inlet means and outlet means for moving the dead end of said thermostat from an initial position in a direction away from said live end in response to a pressure differential exceeding a predetermined value.

16. In an oil cooling device for the circulatory lubricating system of an internal combustion engine, the combination of: a cooler having an oil chamber; inlet means for carrying hot oil to said chamber; outlet means from which the cooled oil is carried off from said chamber; a bypassage conduit connecting said inlet and said outlet for bypassing said chamber; a first normally open valve between said inlet means and chamber; a second normally open valve between said chamber and outlet means; a third normally closed valve for opening and closing said bypassage; and a fluid pressure operated device responsive to the pressure differential between said inlet means and outlet means to open said third valve and close said first and second valves.

17. In a device for responding to the conditions of a stream of fluid confined under pressure, the combination of: a first fluid chamber means connected to receive and discharge fluid; a second fluid chamber means connected to receive and discharge fluid; conduit means between said chambers; a first regulating means; a second regulating means; a first thermostat in said first fluid chamber having its live end connected to actuate said first regulating means; walls defining a first cylindric chamber opening into said first fluid chamber; a piston in said first cylindric chamber connected to actuate the dead end of said first thermostat in a direction toward the live end thereof; conduit means connecting the inner end portion of said first cylindric chamber to a station on said stream outside of said first fluid chamber and of a fluid pressure normally less than that in said first chamber; a first stop limiting movement of the dead end of said first thermostat in a direction toward said live end; a means for yieldably holding the dead end of said first thermostat against said first stop; a second stop limiting movement of the dead end of the first thermostat in the other direction; a second thermostat in said second fluid chamber having its live end connected to actuate said second regulating means, the live end of said first thermostat having a separable end thrust connection with the dead end of said second thermostat; walls defining a second cylindric chamber opening into said second fluid chamber; a piston in said second cylindric chamber connected to actuate the dead end of said second thermostat in a direction toward the live end thereof; conduit means connecting the inner end portion of said second cylindric chamber to a station on said stream outside of said second fluid chamber and of a fluid pressure normally greater than that in said second chamber; and a means for yieldably holding the dead end of said second thermostat against the live end of said first thermostat, said first mentioned yieldable means being more powerful than said last mentioned yieldable means.

GEORGE W. McENTIRE.